US012710892B2

(12) United States Patent
Brandt et al.

(10) Patent No.: US 12,710,892 B2
(45) Date of Patent: Aug. 18, 2026

(54) RECLAIM UNIT ORGANIZATION BY ENDURANCE CAPABILITY

(71) Applicant: Micron Technology, Inc., Boise, ID (US)

(72) Inventors: Kevin R Brandt, Boise, ID (US); Sampath Ratnam, San Jose, CA (US); David Ebsen, Minnetonka, MN (US); Brent Carl Byron, Boise, ID (US); Daniel J. Hubbard, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 21 days.

(21) Appl. No.: 18/784,167

(22) Filed: Jul. 25, 2024

(65) Prior Publication Data

US 2025/0036303 A1 Jan. 30, 2025

Related U.S. Application Data

(60) Provisional application No. 63/528,775, filed on Jul. 25, 2023.

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ...... G06F 3/0604; G06F 3/0616; G06F 3/064; G06F 3/0644
See application file for complete search history.

(56) References Cited

U.S. PATENT DOCUMENTS

| | | | |
|---|---|---|---|
| 9,575,668 B1 | 2/2017 | Martin | |
| 10,809,931 B1 | 10/2020 | Martin et al. | |
| 2014/0215129 A1* | 7/2014 | Kuzmin | G06F 12/0246 711/103 |
| 2016/0335179 A1* | 11/2016 | Lee | G06F 3/0614 |
| 2017/0255399 A1* | 9/2017 | Yang | G06F 3/064 |
| 2020/0167087 A1* | 5/2020 | Christensen | G06F 3/0631 |

(Continued)

FOREIGN PATENT DOCUMENTS

WO 2025024668 1/2025

OTHER PUBLICATIONS

"International Application Serial No. PCT US2024 039556, International Search Report mailed Nov. 6, 2024", 3 pages.

(Continued)

*Primary Examiner* — Nicholas A. Paperno
(74) *Attorney, Agent, or Firm* — Schwegman Lundberg & Woessner, P.A.

(57) ABSTRACT

Aspects of the present disclosure configure a memory sub-system controller to allow a host to control storage on the memory sub-system based on endurance of memory components. The controller groups the set of memory components into a plurality of categories representing different endurance levels of the set of memory components and communicates, to a host, information about the plurality of categories. The controller receives, from the host, a request to program data into an individual memory component of the set of memory components, the request being generated by the host based on a type of the data and an individual category associated with the individual memory component.

20 Claims, 8 Drawing Sheets

(56) References Cited

U.S. PATENT DOCUMENTS

| | | | | |
|---|---|---|---|---|
| 2020/0326871 | A1* | 10/2020 | Wu | G06F 3/0647 |
| 2021/0064287 | A1* | 3/2021 | Kanno | G06F 3/0659 |
| 2021/0149592 | A1* | 5/2021 | Papandreou | G06F 3/0653 |
| 2022/0027268 | A1 | 1/2022 | Dorsey | |
| 2022/0155956 | A1* | 5/2022 | Rayaprolu | G11C 11/5642 |
| 2022/0164140 | A1* | 5/2022 | Benisty | G06F 3/0611 |
| 2023/0031288 | A1 | 2/2023 | Szubbocsev | |
| 2023/0061626 | A1* | 3/2023 | Kim | G06F 3/0616 |

OTHER PUBLICATIONS

"International Application Serial No. PCT US2024 039556, Written Opinion mailed Nov. 6, 2024", 4 pages.

* cited by examiner

400

| MEMORY COMPONENT (410) | ENDURANCE CATEGORY (440) |
| --- | --- |
| RU1, RG1 | HIGH ENDURANCE – MAX PEC > THRESHOLD 1 |
| LBA1-25 | MEDIUM ENDURANCE – THRESHOLD 2 < MAX PEC < THRESHOLD 1 |
| RU2, RG1 | LOW ENDURANCE – MAX PEC < THRESHOLD 2 |
| RG2 | SLC STORAGE |
| RG1 | QLC STORAGE |

RECLAIM UNIT ORGANIZATION BY ENDURANCE CAPABILITY

PRIORITY APPLICATION

This application claims the benefit of priority to U.S. Provisional Application Ser. No. 63/528,775, filed Jul. 25, 2023, which is incorporated herein by reference in its entirety.

TECHNICAL FIELD

Examples of the disclosure relate generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components. Some memory sub-systems arrange their memory components into reclaim groups (RGs), each of which includes sets of reclaim units (RUs). Such memory sub-systems enable a host to control the physical location (e.g., by RG and/or RU via an RU handle) into which data is programmed.

BRIEF DESCRIPTION OF THE DRAWINGS

The present disclosure will be understood more fully from the detailed description given below and from the accompanying drawings of various embodiments of the disclosure.

FIG. 4 is a block diagram of an example table of memory component categories, in accordance with some implementations of the present disclosure.

DETAILED DESCRIPTION

Figure 1:
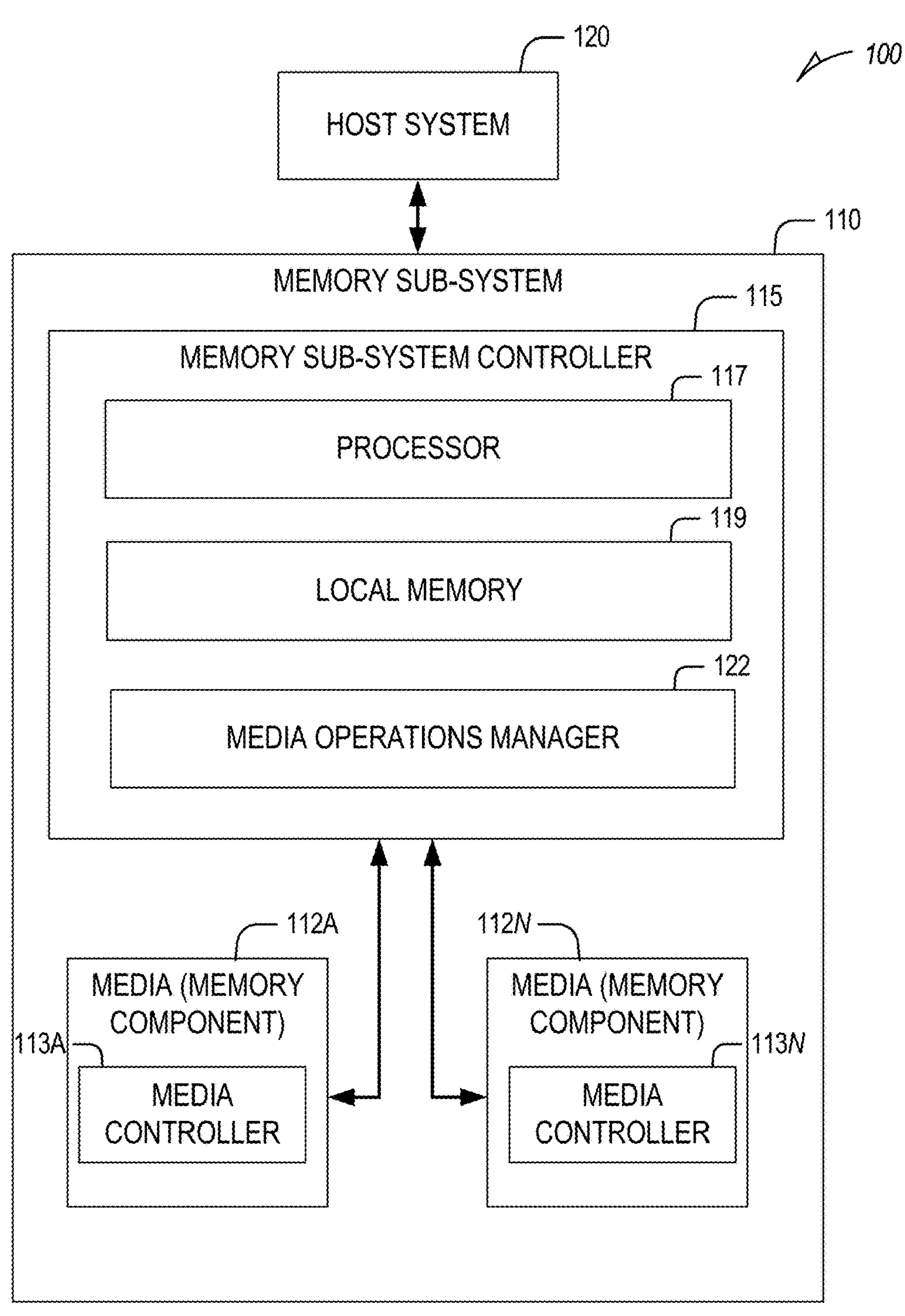
FIG. 1 is a block diagram illustrating an example computing environment including a memory sub-system, in accordance with some examples of the present disclosure.

Examples of the present disclosure configure a system component, such as a memory sub-system controller, to allow a host to control/select the type of memory component used to store data by the memory sub-system based on a category of such memory component. The category can represent a type of storage or bit level organization of the memory component (e.g., SLC, QLC, TLC, and/or MLC) and/or a reliability and/or endurance level of the memory component. The endurance level can range from low, medium, and high endurance level or any level in between. A low endurance level represents a maximum PEC of the memory component being below a first threshold; a medium endurance level represents a maximum PEC of the memory component being between the first threshold and a second threshold; and a high endurance level represents a maximum PEC of the memory component being above the second threshold. The memory sub-system controller can provide to a host a list of different categories along with their respective write amplification and/or endurance level. Based on the type of data that the host intends to store in the memory sub-system, the host can select the category that suits the type of data. In this way, the host can avoid using up or consuming memory component storage space that has a high endurance level for data that is ephemeral or is not going to be overwritten or kept for more than a threshold period. This saves use of such storage space for other type of data and can reduce the write amplitude. This ensures that performance of the memory system remains optimal by tailoring the storage resources used by the memory sub-system to the specific type of data that a host intends to store. This improves the overall efficiency of operating the memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies or planes across multiple memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data". In some cases, the memory sub-system includes an optional feature, such as a Flexible Data Placement (FDP) feature that defines RGs and RUs. This protocol enables remote hosts to control data storage on the memory sub-systems.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data". "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Such blocks can be referred to or addressed as logical units (LUN). Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

Certain memory systems group the physical memory components into different RGs where each RG includes multiple RUs. The RUs can be of any size that is at least as large as the LUN. Namely, the RU can be the size of a single block or can be the size of a superblock spanning multiple memory dies. These memory systems allow hosts to store data to certain RG and/or to certain RUs within those RGs using corresponding RU handles (write pointers). This provides greater control to the host as to where data is physically stored. Once data is stored to an individual RG, garbage collection operations can be performed but are limited to folding data using the RUs of the individual RG. Namely, data cannot be folded into any RU or another RG, but all remains stored in the same RG.

While allowing host devices to control where data is physically stored provides additional flexibility, such processes also introduce inefficiencies in data storage. For example, the need to perform garbage collection operations within the same RG or RU can increase the write amplitude of the memory sub-system. Also, in some cases, data which is stale and no longer needed can be folded in the RG which unnecessarily increases the write amplitude and wastes resources. In addition, applying the same data unit size and error correction code and techniques for storing any data in the memory sub-system may result in inefficient operations. Namely, applying a one-size-fits-all approach to all data types may not provide the best use of the memory sub-system. Because the memory sub-system controller is unaware of which type of data is being stored, the memory sub-system controller treats all data with the same level of importance and applies the same error correction techniques and storage unit sizes without involving the host. Also, the memory sub-system controller cannot determine whether to store data to high endurance level memory component or low endurance level memory components resulting in storage of data to the memory components regardless of the endurance level. This can degrade the memory performance and efficiency, such as by increasing the write amplitude.

Aspects of the present disclosure address the above and other deficiencies by providing a memory controller that can coordinate with a host as to which memory component category to leverage to store data at any given time. Namely, the memory controller can inform the host about different types of categories that are available, such as for different memory components, blocks, dies, RUs, RGs, and/or endurance groups or endurance levels. The host can analyze the data that needs to be stored and selectively choose one of the categories to leverage for storing data on the memory sub-system. In this way, data can be stored on the memory sub-system in an efficient manner. For example, data that is ephemeral or is not re-written or overwritten more than a threshold period of times can be stored in lower endurance level (or endurance group of) memory components than other types of data that may be re-written more frequency and is more random. This increases the overall efficiency of operating the memory sub-system. Any discussion pertaining to controlling storage of data based on endurance level can similarly be applied to controlling storage of data based on endurance group assignments.

In some examples, the memory controller groups the set of memory components into a plurality of categories representing different endurance level (or group) of the set of memory components. The memory controller communicates (synchronously or asynchronously), to a host, information about the plurality of categories. The memory controller receives, from the host, a request to program data into an individual memory component of the set of memory components. The request can be generated by the host based on a type of the data and an individual category associated with the individual memory component.

In some examples, the techniques described herein relate to a system, wherein the memory sub-system includes FDP. In some cases, the memory controller groups the set of memory components into a plurality of reclaim groups (RGs), each RG of the plurality of RGs including a subset of reclaim units (RUs).

In some examples, the information indicates which of the plurality of categories is associated with each RU. In some cases, the information indicates which of the plurality of categories is associated with each RG. In some examples, the endurance level represented by each of the plurality of categories corresponds to a maximum quantity of program-erase cycles (PECs) that can be performed.

In some examples, the plurality of categories represents respective organization of storage blocks by bits per cell. In some cases, the organization by bits per cell includes single level cell (SLC) organization, triple level cell (TLC) organization, and quad level cell (QLC) organization. In some examples, the host determines that the type of data corresponds to data that is overwritten less than a threshold quantity of times, and in response, selects the individual category corresponding to a first endurance level that is lower than a second endurance level.

In some examples, the host generates the request to program the data using a write handle associated with the individual category corresponding to the first endurance level. In some examples, the host determines that the type of data corresponds to data that is overwritten greater than a threshold quantity of times. In response to determining that the type of data corresponds to data that is overwritten greater than the threshold quantity of times, the host selects the individual category corresponding to a first endurance level that is greater than a second endurance level.

In some examples, the host determines that the type of data corresponds to data that is overwritten greater than a threshold quantity of times, the data corresponding to random host writes. In response to determining that the type of data corresponds to data that is overwritten greater than the threshold quantity of times, the host selects the individual category corresponding to a first bit level organization that is less dense than a second bit level organization. In some cases, the first bit level organization corresponds to single level cell (SLC) storage, and the second bit level organization corresponds to tri level cell (TLC) storage or quad level cell (QLC) storage.

In some examples, the memory controller generates a log that includes a list of the plurality of categories. In some aspects, the memory controller groups the set of memory components into a plurality of reclaim groups (RGs), each RG of the plurality of RGs including a subset of reclaim units (RUs), a first of the RUs of an individual one of the plurality of RGs being associated with a first of the plurality of categories, and a second of the RUs of the individual one of the plurality of RGs being associated with a second of the plurality of categories. In some cases, the host generates an instruction to program the data using an RU handle associated with the second of the RUs.

Though various examples are described herein as being implemented with respect to a memory sub-system (e.g., a controller of the memory sub-system), some or all the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies). Each memory die can include a plurality of planes in which data can be stored or programmed.

In some examples, one of the memory components 112A to 112N can be associated with a first RG and another one of the memory components 112A to 112N can be associated with a second RG. In some cases, a first portion of the memory components 112A to 112N can be associated with a first RU of the first RG and a second portion of the memory components 112A to 112N can be associated with a second RU of the second RG. The memory sub-system 110 can have any number of RGs and any number of RUs within each RG and can, in some cases, can implement the FDP.

In some examples, the first memory component 112A, block, or page of the first memory component 112A, or group of memory components including the first memory component 112A can be associated with a first reliability (capability) grade, value, measure, or lifetime (maximum) PEC. The terms "reliability grade," "endurance level," "reliability value" and "reliability measure" are used interchangeably throughout and can have the same meaning. The second memory component 112N or group of memory components including the second memory component 112N can be associated with a second reliability (capability) grade, value, measure, or lifetime (maximum) PEC. In some examples, each memory component 112A to 112N can store respective configuration data that specifies the respective reliability grade and lifetime PEC and current PEC. In some examples, a memory or register can be associated with all the memory components 112A to 112N and can store a table that maps different RUs, RGs, groups, bins or sets of the memory components 112A to 112N to respective endurance levels, endurance categories, reliability grades, lifetime PEC values, and/or current PEC values.

In some examples, a memory or register can be associated with all the memory components 112A to 112N and can store a table that maps portions of the memory components 112A to 112N to different groups of RG. The table can specify which set of memory components 112A to 112N maps to or is associated with and grouped with a first RG and within that set which portions of the memory components 112A to 112N correspond to RUs within the first RG. The table can also store an indication and keep track of the number of PEC of the first RG. Similarly, the table can specify which other set of memory components 112A to 112N maps to or is associated with and grouped with a second RG, and within that set, which portions of the memory components 112A to 112N correspond to RUs within the second RG. In some cases, the table stores a list of LBAs associated with each RU. In some cases, the table can associate different endurance level categories with different ones of the RUs. Endurance level categories can represent a maximum or lifetime PEC of an individual RU and/or RG and/or can represent a bit level storage organization type for the individual RU and/or RG (e.g., bit level storage organization type such as, SLC, QLC, MLC, TLC, and so forth).

In some examples, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some examples, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA)

interface, a peripheral component interconnect express (PCIe) interface, a compute express link (CXL), a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe or CXL interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some examples, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. For example, a single first row that spans a first set of the pages or blocks of the memory components 112A to 112N can correspond to or be grouped as a first block stripe and a single second row that spans a second set of the pages or blocks of the memory components 112A to 112N can correspond to or be grouped as a second block stripe.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, garbage collection operations, different near miss ECC operations, and/or different dynamic data refresh.

The memory sub-system controller 115 can include hardware, such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some examples, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112N to 112N. The configuration data can describe the lifetime (maximum) PEC values, endurance level category, and/or reliability grades associated with different groups of the memory components 112N to 112N and/or different blocks within each of the memory components 112N to 112N and/or different RUs, and/or different RGs.

In some examples, commands or operations received from the host system 120 can include a write command which can specify or identify an individual RG and/or RU within the individual RG to which to program data. Based on the individual RG specified by the write command, the memory sub-system controller 115 can determine the memory components 112A to 112N associated with the individual RG and can generate a write pointer that is used to program the data to the determined memory components 112A to 112N. In some cases, the host system 120 can select an individual RU handle and can program data using the selected individual RU handle. Any data that is written by the host system 120 using the individual RU handle can be stored to a specified RU that is associated with the RU handle. Based on which RU handle is used by the host system 120 to program data, different RUs are used by the host system 120 to physically store the data. In some cases, the host system 120 can track which LBAs are associated with which RU handles and can determine based on the LBAs the RUs in which the data is stored.

In some examples, different RUs can be associated with endurance level categories (e.g., representing different bit level organization and/or different lifetime PECs of the different RUs). In such cases, the host system 120 can utilize a particular category for storing certain types of data by storing the data using an individual RU handle that is associated with the category. For example, a first RU can be associated with a first RU handle and can be associated with a first endurance level category and a second RU can be associated with a second RU handle and can be associated with a second endurance level category. The host system 120 can store data according to the first endurance level category by storing data using the first RU handle. Similarly, the host system 120 can store data according to the second endurance level category by storing data using the second RU handle.

The memory sub-system controller 115 can be responsible for other memory management operations, such as wear leveling operations, garbage collection operations, error detection and error-correcting code (ECC) operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to coordinate with the host system 120 as to whether to store data in a memory component associated with one endurance level category or another memory component associated with another endurance level category. Namely, the media operations manager 122 can provide a list of different endurance level categories via a log to the host system 120. The host system 120 can select a particular endurance level category from the log and can then instruct the memory sub-system 110 to store data requested to be programmed by the host system 120 in a memory component (e.g., RU or RG) having the particular endurance level category. In this way, data can be stored in the optimal manner that is suitable for the type of data. This can reduce the write amplitude which improves the overall efficiency of operating the memory sub-system 110.

Depending on the example, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regard to the operations of the media operations manager 122 are described below.

Figure 2:
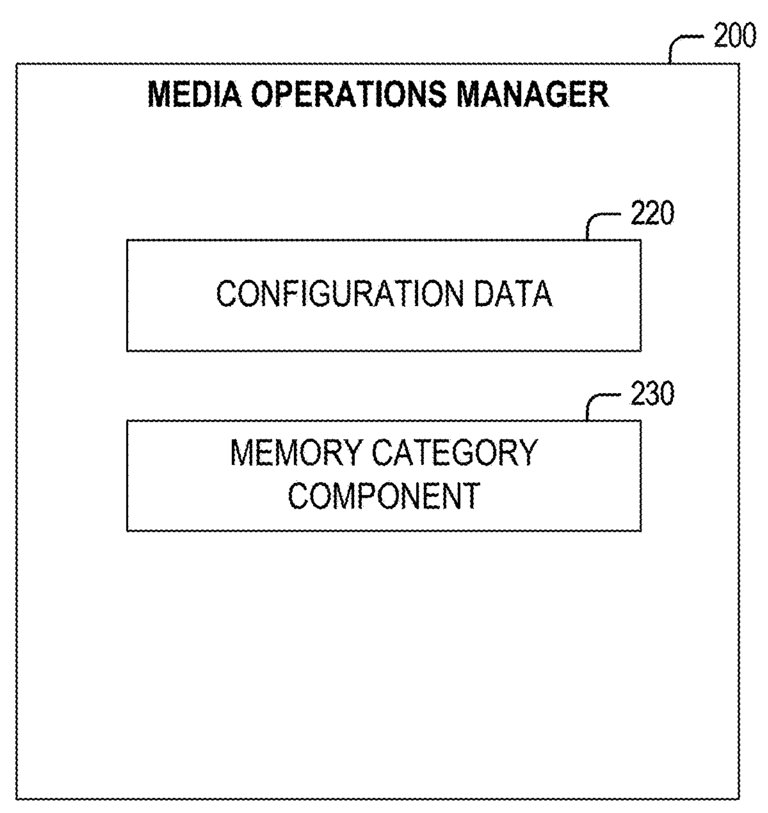
FIG. 2 is a block diagram of an example media operations manager, in accordance with some implementations of the present disclosure.

FIG. 2 is a block diagram of an example media operations manager 200 (corresponding to media operations manager 122), in accordance with some implementations of the present disclosure. As illustrated, the media operations manager 200 includes configuration data 220 and a memory category component 230. For some examples, the media operations manager 200 can differ in components or arrangement (e.g., less, or more components) from what is illustrated in FIG. 2.

The configuration data 220 accesses and/or stores configuration data associated with the memory components 112A to 112N of FIG. 1. In some examples, the configuration data 220 is programmed into the media operations manager 200. For example, the media operations manager 200 can communicate with the memory components 112A to 112N to obtain the configuration data and store the configuration data 220 locally on the media operations manager 122 of FIG. 1. In some examples, the media operations manager 122 communicates with the host system 120 of FIG. 1. The host system 120 receives input from an operator or user that specifies parameters including an endurance level category that controls in which type of memory component data is stored by the media operations manager 122, lifetime (maximum) PEC values of different bins, groups, blocks, block stripes, memory dies, RUs, RGs, and/or sets of the memory components 112A to 112N, and/or group assignments that define the sizes of different RU and RGs. The media operations manager 122 can receive configuration data from the host system 120 and stores the configuration data in the configuration data 220.

The configuration data 220 can store a map that identifies which sets of memory components 112A to 112N are used to implement different RGs. For example, the configuration data 220 can store a map that associates a first RG with a first portion of the memory components 112A to 112N (e.g., a first die or first set of LBAs) and that associates a second RG with a second portion of the memory components 112A to 112N (e.g., a second die or second set of LBAs). Namely, the map can store an indication of the physical addresses or LUN of the first portion of the memory components 112A to 112N associated with the first RG and an indication of the physical addresses or LUN of the second portion of the memory components 112A to 112N associated with the second RG. The configuration data 220 can store indications of different endurance level categories and/or endurance groups associated with different RGs and/or RUs.

Figure 3A:
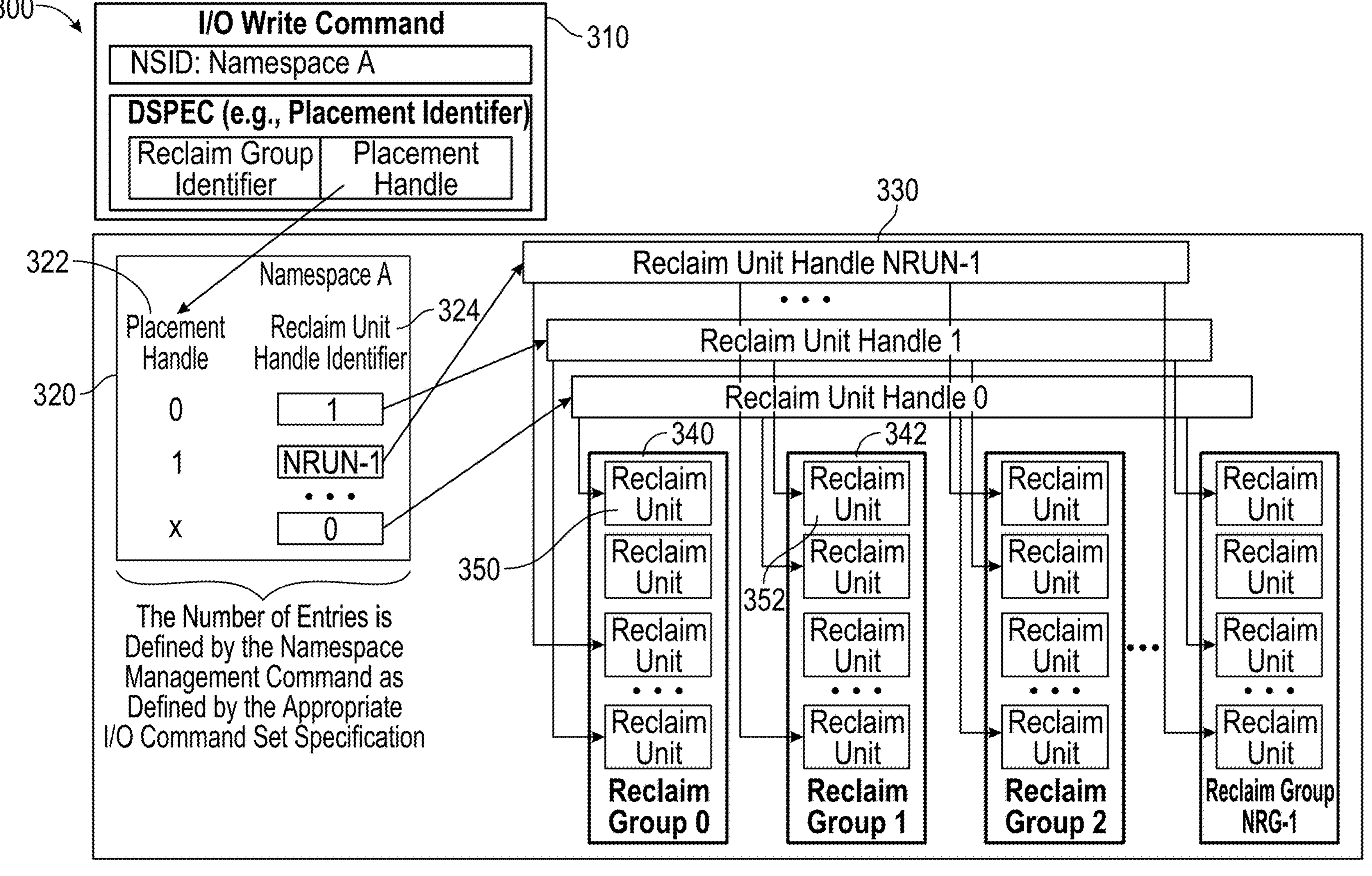
FIGS. 3A and 3B are block diagrams of example RG system implementations of the memory sub-system, in accordance with some implementations of the present disclosure.

For example, FIG. 3A is a block diagram of an example RG system 300 implementation of the memory sub-system 110 of FIG. 1. The RG system 300 includes a placement handle component 320 that is used to store the map of different groups (e.g., the map stored by the configuration data 220). The RG system 300 can receive a write command 310 that specifies at least an RG and/or a placement handle. The placement handle component 320 can search the map using the placement handle 322 to identify the RU 324 associated with the specified RG. The RG system 300 can then generate a write pointer 330 to write data to the identified RU 324.

As shown in FIG. 3A, multiple RGs are defined. For example, the RG system 300 includes a first RG 340 and a second RG 342. The first RG 340 includes a first group of RUs 350. The second RG 342 includes a second group of RUs 352. In some cases, the first RG 340 can represent a single memory die and the second RG 342 represents another single memory die. Each RU in the first group of RUs 350 is implemented by a portion of the memory components 112A to 112N of FIG. 1, such as blocks, planes, superblocks, pages, and so forth. Similarly, each RU in the second group of RUs 350 is implemented by a different portion of the memory components 112A to 112N, such as blocks, planes, superblocks, pages, and so forth. All the garbage collection operations performed within RUs of an individual RG are constrained to that individual RG. For example, garbage collection operations performed on an individual RU of the first group of RUs 350 fold data using only the RUs in the first group of RUs 350 and garbage collection operations performed on an individual RU of the second group of RUs 352 fold data using only the RUs in the second group of RUs 352.

Figure 3B:
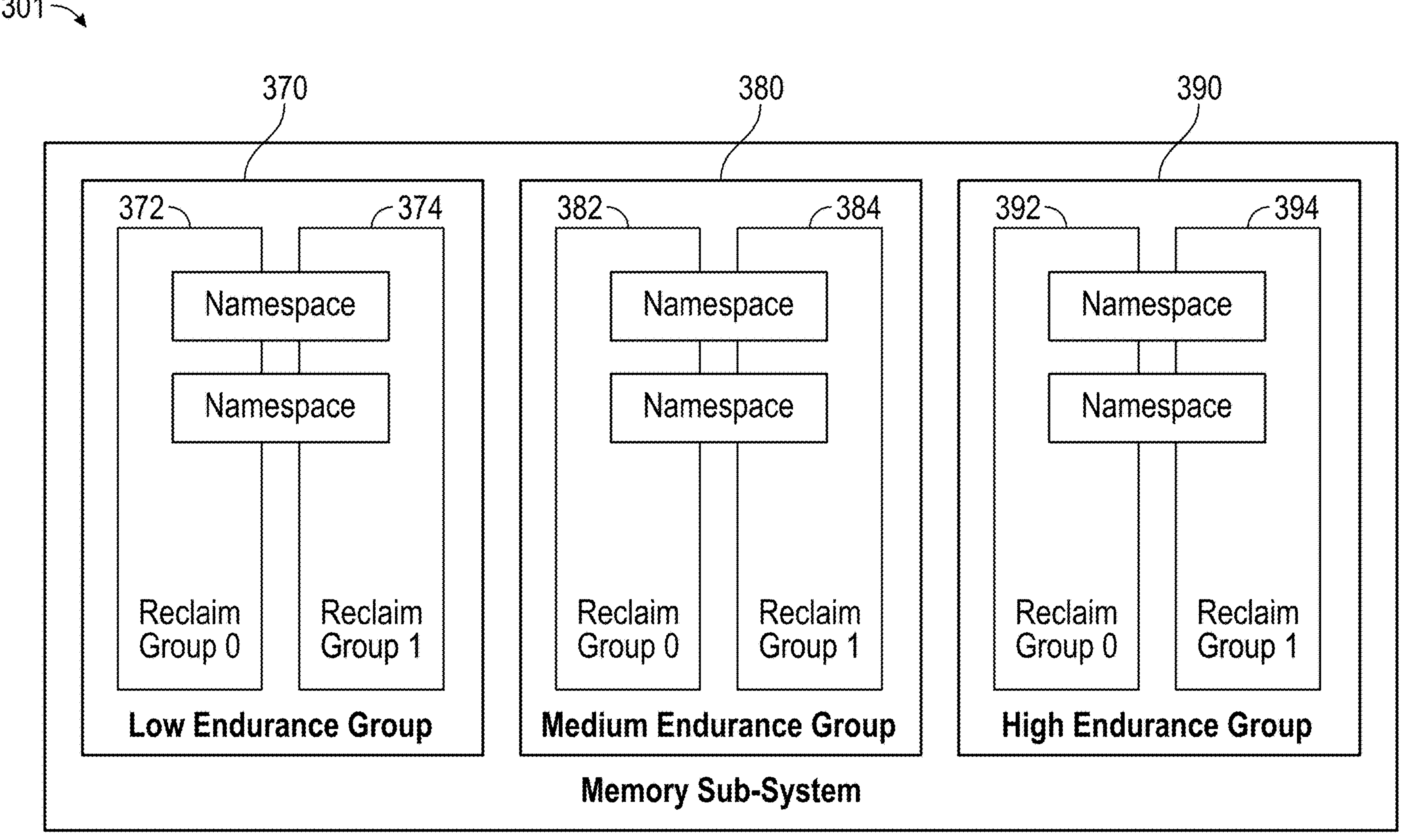

As shown in the diagram 301 of FIG. 3B, the memory sub-system 110 includes multiple RGs placed in or associated with different endurance groups. For example, a first endurance group 370 (corresponding to a low endurance group representing memory components that are associated with lifetime PECs that are below a first threshold) can include a first set of memory components 372 of a first RG and a second set of memory components 374 of a second RG. A second endurance group 380 (corresponding to a medium endurance group representing memory components that are associated with lifetime PECs that are between the first threshold and a second threshold) can include a third set of memory components 382 of the first RG and a fourth set of memory components 384 of the second RG. A third endurance group 390 (corresponding to a high endurance group representing memory components that are associated with lifetime PECs that are greater than the second threshold) can include a fifth set of memory components 392 of the first RG and a sixth set of memory components 394 of the second RG.

An endurance group is a construct where all memory components (blocks) in the same endurance group are wear leveled as a pool. In such cases, the first set of memory components 372 and the second set of memory components 374 can be wear leveled as a pool to spread out the PECs across the memory components in the pool evenly. In such cases, after one portion of the first set of memory components 372 encounter one or more PECs, GC operations are performed on a portion of the second set of memory components 374 before performing GC operations on the one portion of the first set of memory components 372. Namely, data can be moved between portions of the memory components in the same endurance group to perform GC operations to wear level the memory components as a pool.

Referring to FIG. 2, the memory category component 230 generates a log or file that lists available endurance level categories that a host system 120 can select from to control how data is stored and what type of memory component is used to store the data by the memory sub-system 110 of FIG. 1. FIG. 4 shows an example log 400 of the different endurance level categories. For example, the log 400 includes a memory component field 410 that identifies different memory components (e.g., different RUs, RGs, LBAs, blocks, pages, or other suitable memory component) and an endurance category field 440 that provides the endurance category level for each memory component. As an example, a first memory component 446 can specify a first portion of the memory components 112A to 112N of FIG. 1. The endurance category field 440 associated with the first memory component 446 can indicate that such a first memory component 446 is associated with a high endurance category level. The high endurance category level can indicate or be associated with a maximum PEC that is greater than a first threshold. This can be suitable for storing long-term data that needs to be retained for a long period of time and is overwritten a large number of times.

As another example, a second memory component 412 can identify an RU that is in an individual RG. The endurance category field 440 associated with the second memory component 412 can indicate that such a second memory component 412 is associated with a medium endurance level category. The medium endurance level category can indicate or be associated with a maximum PEC that is between a second threshold and the first threshold. As another example, a third memory component in the memory component field 410 can be associated with a low endurance level category which indicates or is associated with a maximum PEC that is lower than the second threshold. Other endurance level categories can indicate type of storage or bit level organization, such as SLC or QLC storage for different memory components (e.g., different RUs or RGs).

In some examples, the host system 120 of FIG. 1 accesses log 400 and selects an individual endurance level category from the list. This can be performed based on the type of data the host system 120 intends to store at a given time to the memory sub-system 110 of FIG. 1. Once the individual endurance level category is selected, the host system 120 can transmit a communication to the memory sub-system 110 or the memory category component 230 of FIG. 2 identifying the selected endurance level category. The memory category component 230 can store subsequently received data from the host system 120 into an individual memory component and/or RU and/or RG associated with the selected endurance level category. In such cases, the memory category component 230 can search the log 400 to identify one or more memory components associated with the selected endurance level category and can store data to the identified one or more memory components.

In some examples, the host system 120 can determine, from the log 400, different RU handles that correspond to each one of the memory component fields 410 in the log 400. The host system 120 can then write data to the memory components 112A to 112N using an individual one of the RU handles that corresponds to the endurance level category corresponding to the type of data being stored. For example, if ephemeral data is being stored, the host system 120 can select and use a first RU handle that corresponds to a first endurance level category (e.g., a low endurance level category or SLC storage). If another type of data is being stored that needs to be retained longer, the host system 120 can select and use a second RU handle that corresponds to a second endurance level category (e.g., a medium or high endurance level category or QLC storage). The memory category component 230 can then store and manage the data being stored to different RUs based on the endurance level category associated with the respective RU.

Figure 5:
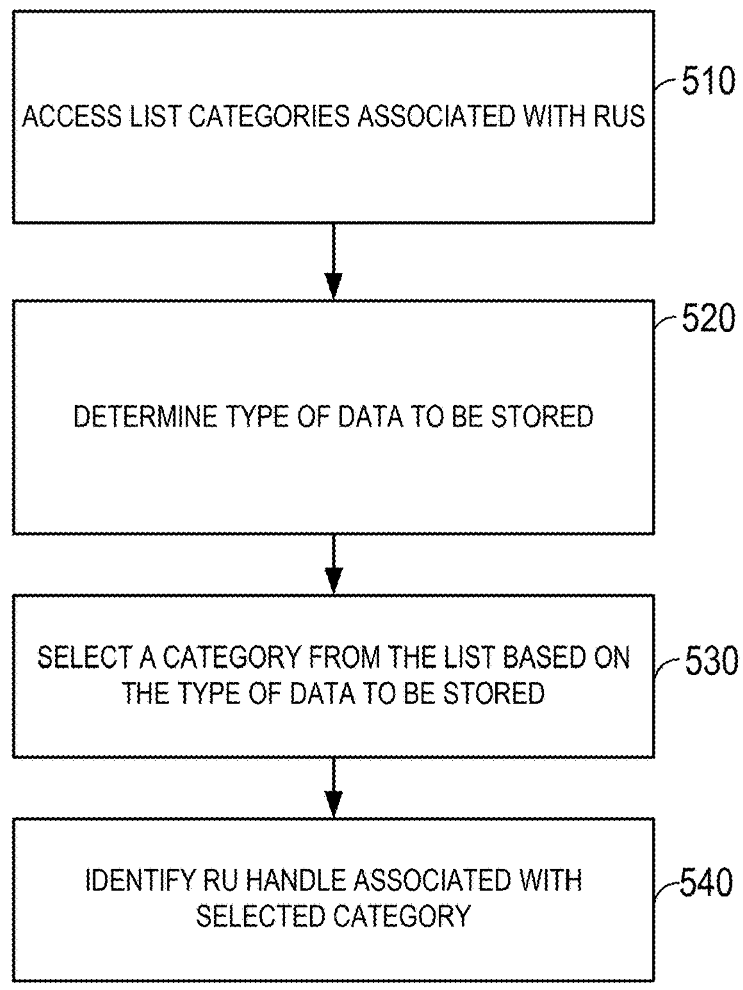
FIGS. 5 and 6 are flow diagrams of example methods to allow a host to control storage of data on a memory sub-system based on memory component categories, in accordance with some implementations of the present disclosure.

FIG. 5 is a flow diagram of an example method 500 to allow a host to control the storage of data on the memory sub-system, in accordance with some implementations of the present disclosure. The method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 500 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 5, the method (or process) 500 begins at operation 510, with a host system 120 of FIG. 1 accessing a list of categories associated with RUs, RGs, and/or different memory components from the memory sub-system 110 of FIG. 1. Then, at operation 520, the host system 120 determines a type of data to be stored (e.g., ephemeral data or persistent data that needs to be retained for a substantially longer period of time than the ephemeral data or random data). At operation 530, the host system 120 selects a category from the list based on the type of the data to be stored and, at operation 540, the host system 120 identifies an RU handle associated with the selected category.

Figure 6:
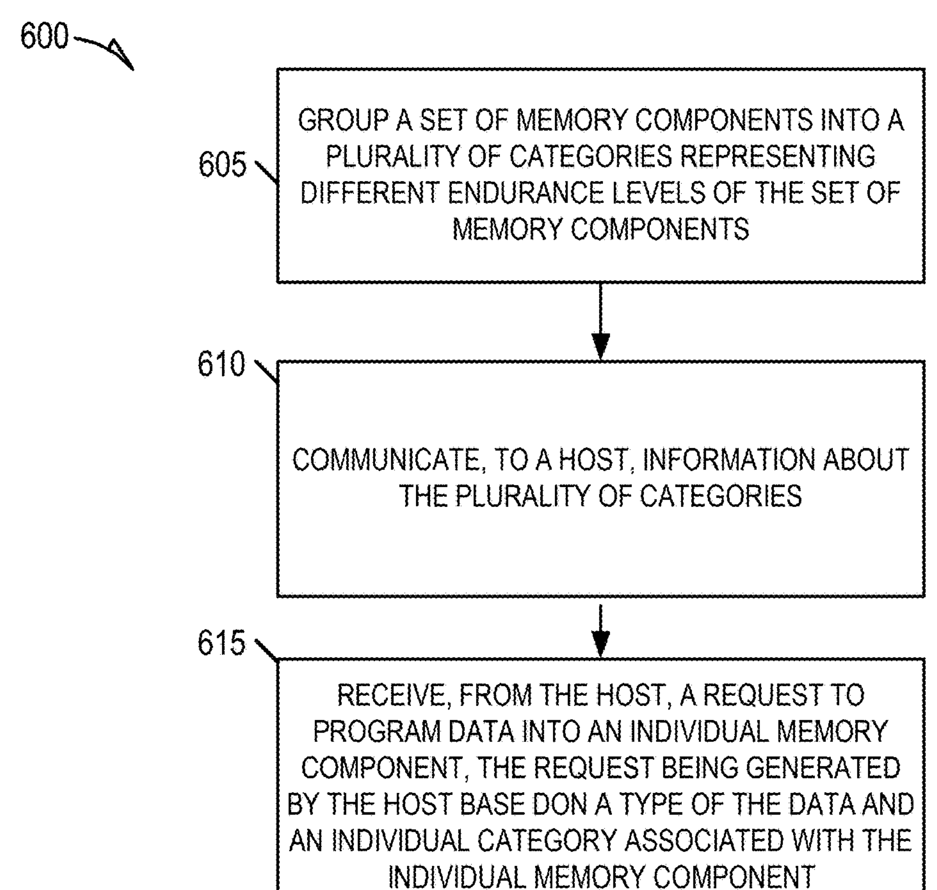

FIG. 6 is a flow diagram of an example method 600 to allow a host to control the storage of data on the memory sub-system, in accordance with some implementations of the present disclosure. The method 600 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, method 600 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 6, the method (or process) 600 begins at operation 605, with a media operations manager 122 of FIG. 1 of a memory sub-system (e.g., memory sub-system 110 of FIG. 1) grouping a set of memory components into a plurality of categories representing different endurance level of the set of memory components. Then, at operation 610, the media operations manager 122 communicates, to host system 120, information about the plurality of categories, such as synchronously (e.g., via a log or other file) or asynchronously. At operation 615, the media operations manager 122 receives from the host system 120, a request to program data into an individual memory component of the set of memory components. The request can be generated by the host system 120 based on a type of the data and an individual category associated with the individual memory component.

In view of the disclosure above, various examples are set forth below. It should be noted that one or more features of an example, taken in isolation or combination, should be considered within the disclosure of this application.

Example 1: A system comprising: a set of memory components of a memory sub-system; and at least one processing device operatively coupled to the set of memory components, the at least one processing device being configured to perform operations comprising: grouping the set of memory components into a plurality of categories representing different endurance levels of the set of memory components; communicating, to a host, information about the plurality of categories; and receiving, from the host, a request to program data into an individual memory component of the set of memory components, the request being generated by the host based on a type of the data and an individual category associated with the individual memory component.

Example 2. The system of Example 1, wherein the memory sub-system includes Flexible Data Placement (FDP).

Example 3. The system of Example 2, the operations comprising: grouping the set of memory components into a plurality of reclaim groups (RGs), each RG of the plurality of RGs comprising a subset of reclaim units (RUs).

Example 4. The system of Example 3, wherein the information indicates which of the plurality of categories is associated with each RU.

Example 5. The system of any one of Examples 3-4, wherein the information indicates which of the plurality of categories is associated with each RG.

Example 6. The system of any one of Examples 1-5, wherein the endurance level represented by each of the plurality of categories corresponds to a maximum quantity of program-erase (PE) cycles that can be performed.

Example 7. The system of any one of Examples 1-6, wherein the plurality of categories represents respective organization of storage blocks by bits per cell.

Example 8. The system of Example 7, wherein the organization by bits per cell includes single level cell (SLC) organization, triple level cell (TLC) organization, and quad level cell (QLC) organization.

Example 9. The system of any one of Examples 1-8, the operations comprising: determining, by the host, that the type of data corresponds to data that is overwritten less than a threshold quantity of times; and in response to determining that the type of data corresponds to data that is overwritten less than the threshold quantity of times, selecting, by the host, the individual category corresponding to a first endurance level that is lower than a second endurance level.

Example 10. The system of Example 9, the operations comprising: generating the request to program the data using a write handle associated with the individual category corresponding to the first endurance level.

Example 11. The system of any one of Examples 1-10, the operations comprising: determining, by the host, that the type of data corresponds to data that is overwritten greater than a threshold quantity of times; and in response to determining that the type of data corresponds to data that is overwritten greater than the threshold quantity of times, selecting, by the host, the individual category corresponding to a first endurance level that is greater than a second endurance level.

Example 12. The system of any one of Examples 1-11, the operations comprising: determining, by the host, that the type of data corresponds to data that is overwritten greater than a threshold quantity of times, the data corresponds to random host writes; and in response to determining that the type of data corresponds to data that is overwritten greater than the threshold quantity of times, selecting, by the host, the individual category corresponding to a first bit level organization that is less dense than a second bit level organization.

Example 13. The system of Example 12, wherein the first bit level organization corresponds to single level cell (SLC) storage, and wherein the second bit level organization corresponds to tri level cell (TLC) storage or quad level cell (QLC) storage.

Example 14. The system of any one of Examples 1-13, the operations comprising: generating a log that includes a list of the plurality of categories.

Example 15. The system of any one of Examples 1-14, the operations comprising: grouping the set of memory components into a plurality of reclaim groups (RGs), each RG of the plurality of RGs comprising a subset of reclaim units (RUS), a first of the RUs of an individual one of the plurality of RGs being associated with a first of the plurality of categories, and a second of the RUs of the individual one of the plurality of RGs being associated with a second of the plurality of categories.

Example 16. The system of Example 15, the operations comprising: generating an instruction by the host to program the data using an RU handle associated with the second of the RUs.

Methods and computer-readable storage medium with instructions for performing any one of the above Examples.

Figure 7:
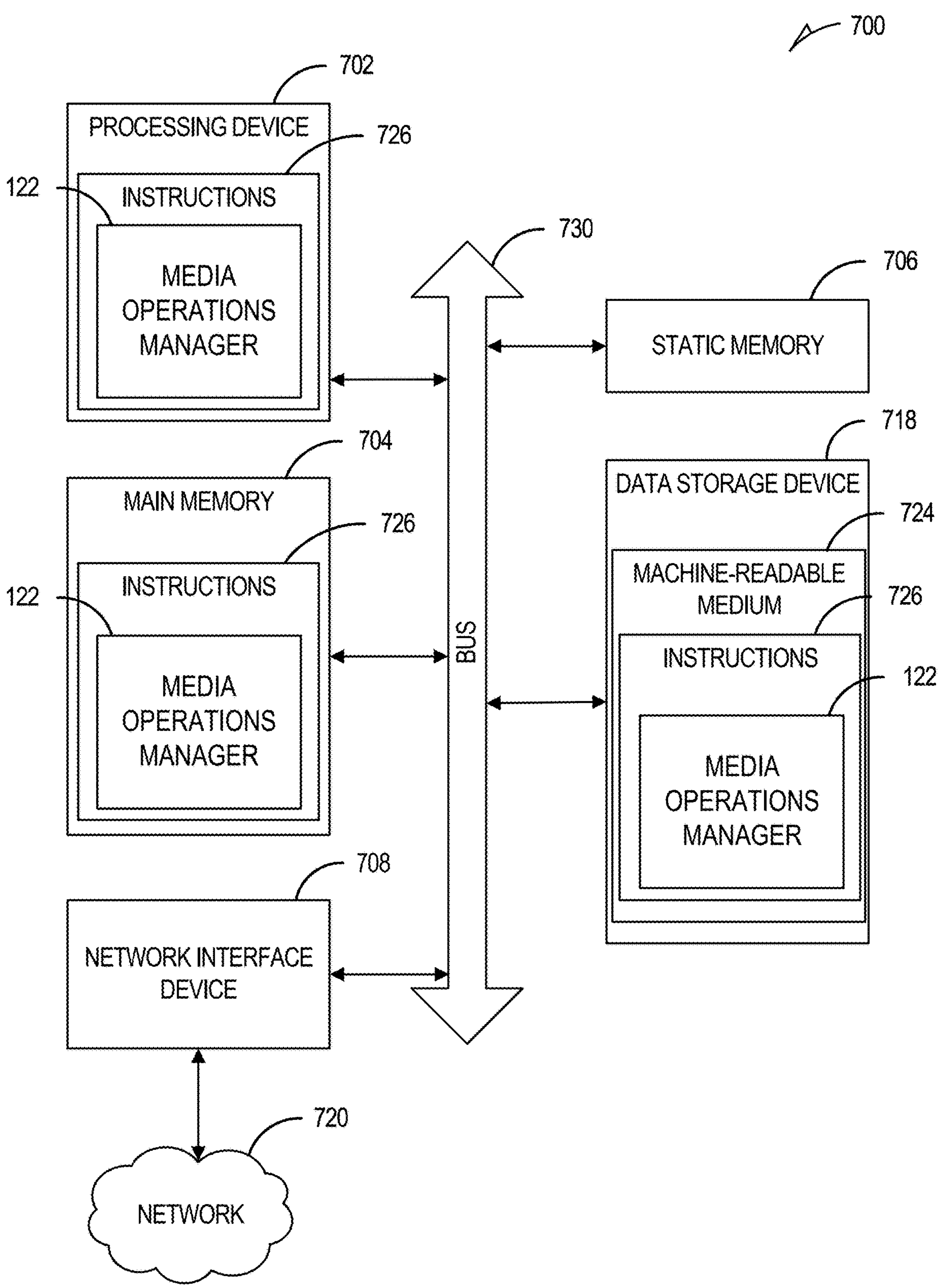
FIG. 7 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory [ROM], flash memory, dynamic random access memory [DRAM] such as synchronous DRAM [SDRAM] or Rambus DRAM [RDRAM], etc.), a static memory 706 (e.g., flash memory, static random access memory [SRAM], etc.), and a data storage system 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 implement functionality corresponding to the media operations manager 122 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any computer or apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader scope of the disclosure as set forth in the following claims. The specification and drawings are, accordingly, to be regarded in an illustrative sense rather than a restrictive sense.

What is claimed is:

1. A system comprising:

a set of memory components of a memory sub-system; and at least one processing device operatively coupled to the set of memory components, the at least one processing device being configured to perform operations comprising:

receiving configuration data, from a host, indicating a maximum quantity of program-erase (PE) cycles that can be performed for different groups of memory components of the set of memory components;

based on the configuration data that has been previously received, grouping the set of memory components into a plurality of categories comprising at least three categories including a high endurance category, a medium endurance category, and a low endurance category representing different endurance levels of the set of memory components comprising the maximum quantity of PE cycles that can be performed, the maximum quantity of PE cycles being tracked separately from current PE cycles associated with each memory component of the set of memory components, wherein the high endurance category corresponds to memory components having a maximum quantity of PE cycles above a first threshold, the medium endurance category corresponds to memory components having a maximum quantity of PE cycles between the first threshold and a second threshold, and the low endurance category corresponds to memory components having a maximum quantity of PE cycles below the second threshold, and wherein a first block of an individual memory component of the set of memory components is associated with a first category comprising the high endurance category representing a maximum quantity of PE cycles above the first threshold and a second block of the individual memory component is associated with a second category comprising the medium endurance category maximum quantity of PE cycles between the first threshold and the second threshold;

communicating, to the host, information identifying the at least three categories; and receiving, from the host, a request to program data into an individual memory component of the set of memory components, the request being generated by the host based on a type of the data and the information identifying the at least three categories.

2. The system of claim 1, wherein the memory sub-system includes Flexible Data Placement (FDP).

3. The system of claim 2, the operations comprising:

grouping the set of memory components into a plurality of reclaim groups (RGs), each RG of the plurality of RGs comprising a subset of reclaim units (RUS).

4. The system of claim 3, wherein information, communicated to the host, indicates which of the plurality of categories is associated with each RU.

5. The system of claim 4, wherein the information indicates which of the plurality of categories is associated with each RG.

6. The system of claim 3, the operations comprising:

folding data in a first RG of the plurality of RGs using the subset of RUs of the first RG without folding the data into any RU of another RG of the plurality of RGs to keep the data stored in the first RG.

7. The system of claim 3, wherein garbage collection operations performed on an individual RU of a first RG of the plurality of RGs fold data using only RUs of the first RG without folding data into any RU of another RG of the plurality of RGs.

8. The system of claim 3, wherein the plurality of categories represents respective organization of storage blocks by bits per cell, the operations comprising receiving the configuration data from the host, and wherein the organization by bits per cell includes single level cell (SLC) organization, triple level cell (TLC) organization, and quad level cell (QLC) organization.

9. The system of claim 1, the operations comprising:

determining, by the host, that the type of data corresponds to data that is overwritten less than a threshold quantity of times; and in response to determining that the type of data corresponds to data that is overwritten less than the threshold quantity of times, selecting, by the host, the individual category corresponding to a first endurance level that is lower than a second endurance level.

10. The system of claim 9, the operations comprising:

generating the request to program the data using a write handle associated with the individual category corresponding to the first endurance level.

11. The system of claim 1, the operations comprising:

determining, by the host, that the type of data corresponds to data that is overwritten greater than a threshold quantity of times; and in response to determining that the type of data corresponds to data that is overwritten greater than the threshold quantity of times, selecting, by the host, the individual category corresponding to a first endurance level that is greater than a second endurance level.

12. The system of claim 1, the operations comprising:

determining, by the host, that the type of data corresponds to data that is overwritten greater than a threshold quantity of times, the data correspond to random host writes; and in response to determining that the type of data corresponds to data that is overwritten greater than the threshold quantity of times, selecting, by the host, the individual category corresponding to a first bit level organization that is less dense than a second bit level organization.

13. The system of claim 12, wherein the first bit level organization corresponds to single level cell (SLC) storage, and wherein the second bit level organization corresponds to tri level cell (TLC) storage or quad level cell (QLC) storage.

14. The system of claim 1, the operations comprising:

storing a table that maps the different groups of the set of memory components to respective endurance levels comprising lifetime PE cycle (PEC) values and current PEC values.

15. The system of claim 1, the operations comprising:

grouping the set of memory components into a plurality of reclaim groups (RGs), each RG of the plurality of RGs comprising a subset of reclaim units (RUS), a first of the RUs of an individual one of the plurality of RGs being associated with the first category, and a second of the RUs of the individual one of the plurality of RGs being associated with the second category.

16. The system of claim 15, the operations comprising:

generating an instruction by the host to program the data using an RU handle associated with the second of the RUs.

17. A method comprising:

receiving configuration data, from a host, indicating a maximum quantity of program-erase (PE) cycles that can be performed for different groups of memory components of a set of memory components;

based on the configuration data that has been previously received, grouping the set of memory components into a plurality of categories comprising at least three categories including a high endurance category, a medium endurance category, and a low endurance category representing different endurance levels of the set of memory components comprising the maximum quantity of PE cycles that can be performed, the maximum quantity of PE cycles being tracked separately from current PE cycles associated with each memory component of the set of memory components, wherein the high endurance category corresponds to memory components having a maximum quantity of PE cycles above a first threshold, the medium endurance category corresponds to memory components having a maximum quantity of PE cycles between the first threshold and a second threshold, and the low endurance category corresponds to memory components having a maximum quantity of PE cycles below the second threshold, and wherein a first block of an individual memory component of the set of memory components is associated with a first category comprising the high endurance category representing a maximum quantity of PE cycles above the first threshold and a second block of the individual memory component is associated with a second category comprising the medium endurance category maximum quantity of PE cycles between the first threshold and the second threshold;

communicating, to the host, information identifying the at least three categories; and receiving, from the host, a request to program data into an individual memory component of the set of memory components, the request being generated by the host based on a type of the data and the information identifying the at least three categories.

18. A non-transitory computer-readable storage medium comprising instructions that, when executed by at least one processing device, cause the at least one processing device to perform operations comprising:

receiving configuration data, from a host, indicating a maximum quantity of program-erase (PE) cycles that can be performed for different groups of memory components of a set of memory components;

based on the configuration data that has been previously received, grouping the set of memory components into a plurality of categories comprising at least three categories including a high endurance category, a medium endurance category, and a low endurance category representing different endurance levels of the set of memory components comprising the maximum quantity of PE cycles that can be performed, the maximum quantity of PE cycles being tracked separately from current PE cycles associated with each memory component of the set of memory components, wherein the high endurance category corresponds to memory components having a maximum quantity of PE cycles above a first threshold, the medium endurance category corresponds to memory components having a maximum quantity of PE cycles between the first threshold and a second threshold, and the low endurance category corresponds to memory components having a maximum quantity of PE cycles below the second threshold, and wherein a first block of an individual memory component of the set of memory components is associated with a first category comprising the high endurance category representing a maximum quantity of PE cycles above the first threshold and a second block of the individual memory component is associated with a second category comprising the medium endurance category maximum quantity of PE cycles between the first threshold and the second threshold;

communicating, to the host, information identifying the at least three categories; and receiving, from the host, a request to program data into an individual memory component of the set of memory components, the request being generated by the host based on a type of the data and the information identifying the at least three categories.

19. The non-transitory computer-readable storage medium of claim 18, wherein the host determines that the type of data corresponds to ephemeral data that is not retained for more than a threshold period, and in response to determining that the type of data corresponds to ephemeral data, the host selects the low endurance category.

20. The non-transitory computer-readable storage medium of claim 18, wherein memory components grouped into a same category of the at least three categories are wear leveled as a pool to spread program-erase cycles across the memory components in the pool.

* * * * *